(12) United States Patent
Grotefend et al.

(10) Patent No.: US 7,014,895 B1
(45) Date of Patent: Mar. 21, 2006

(54) ULTRAVIOLET (UV) POST CURE HEAT TRANSFER LABEL, METHOD OF MAKING AND USING SAME

(75) Inventors: Alan C. Grotefend, Bloomingdale, IL (US); Paul Giusto, Feeding Hills, MA (US); Michael B. Colella, Southington, CT (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 10/990,851

(22) Filed: Nov. 17, 2004

(51) Int. Cl.
*B41M 5/40* (2006.01)

(52) U.S. Cl. .............. 428/32.81; 428/32.62; 428/32.69; 428/32.71; 428/32.72; 428/32.86; 428/913; 428/914; 427/146; 427/147; 427/148; 156/230; 156/247; 156/289; 156/273.3; 156/273.5; 156/278.5

(58) Field of Classification Search ............. 428/32.62, 428/32.69, 32.71, 32.72, 32.81, 32.86, 913, 428/914; 427/146, 147, 148; 156/230, 247, 156/289, 273.3, 273.5, 278.5
See application file for complete search history.

(56) References Cited

U.S. PATENT DOCUMENTS

| | | | |
|---|---|---|---|
| 3,989,609 A | 11/1976 | Brack | |
| 4,299,938 A | 11/1981 | Green et al. | |
| 4,443,289 A * | 4/1984 | Kolges et al. | 156/384 |
| 4,529,624 A | 7/1985 | Hubbard | |
| 4,704,310 A * | 11/1987 | Tighe et al. | 427/261 |
| 5,198,296 A * | 3/1993 | Suzuki et al. | 428/32.79 |
| 5,384,160 A | 1/1995 | Frazzitta | |
| 5,919,834 A * | 7/1999 | Downs et al. | 522/33 |
| 5,945,183 A | 8/1999 | Johnson | |
| 6,235,807 B1 | 5/2001 | Misev | |
| 2001/0009701 A1 | 7/2001 | Schmitt | |
| 2002/0015828 A1 | 2/2002 | Ast | |
| 2002/0081392 A1 | 6/2002 | Kamen et al. | |
| 2004/0052968 A1 | 3/2004 | Takabayashi | |
| 2004/0126507 A1 | 7/2004 | O'Brien | |

\* cited by examiner

*Primary Examiner*—B. Shewareged

(74) *Attorney, Agent, or Firm*—Mark W. Croll, Esq.; Donald J. Breh, Esq.; Welsh & Katz, Ltd.

(57) ABSTRACT

An ultraviolet post cure heat transfer label for application to an item includes a carrier web, a release coat applied to the carrier web and a composition including a cationic ultraviolet curable ink applied to the release coat. The ink has a solvent in a concentration of at a least about 20 percent by weight of the ink. The ink is dried in a non-UV process to form a storable film on the carrier web. The composition is transferred to the item and the ink is cured, by application of ultraviolet energy, following transfer to the item. A method for making the label and a method for marking an item are also disclosed.

12 Claims, 1 Drawing Sheet

US 7,014,895 B1

ULTRAVIOLET (UV) POST CURE HEAT TRANSFER LABEL, METHOD OF MAKING AND USING SAME

BACKGROUND OF THE INVENTION

The present invention relates to heat transfer labels. More particularly, the present invention relates to heat transfer labels printed on a temporary carrier film or paper for application to various substrates, followed by UV curing the label to provide chemical and abrasion resistance.

Labels are in widespread use in most every industry. For example, labels are used to transfer indicia onto all manner of durable goods consumer items ranging from cell phone cases to golf club shafts. Typically, labels consist of thermoplastic colors capable of being heat activated in order to adhere to substrates upon application of heat and pressure. Many of these items to which the indicia are applied are rigid or semi-rigid, thus allowing the label transfer to be carried out using heat transfer methods.

It is of utmost importance that the indicia or marking transferred to the item be of a high quality. In many instances the item is one that is intended to be used for a long period of time. For example, cellular telephones are intended to last for at least a number of years, as are golf clubs. To this end, the indicia printed (e.g., the manufacturer's name, trademark or the like), should be a long-lasting, difficult to abrade and resistant to chemical and environmental degradation.

In order to achieve these operating objective, typical heat transfer labels for substrates such as graphite and many plastics currently require a bake cycle of approximately 60 minutes at 200° F. This is necessary to achieve the chemical and abrasion resistance desired, but must be balanced against (i.e., avoidance of) damage to the substrate due to excessive heat. Likewise, heat transfer labels for glass and metal substrates also require an extended bake cycle at elevated temperatures (e.g., 400° F. for a period of about ten minutes), after the labels have been applied to the substrate to achieve good chemical and abrasion resistance.

In addition, many of the known high quality heat transfer labels are not sufficiently stable prior to application and curing. That is, the labels can have a relatively short shelf life, and as such may not be of the desired quality after a prolonged storage period.

Accordingly, there is a need for a high quality heat transfer label that has high chemical and abrasion resistance. Desirably, such a label is easily made (e.g., printed), using readily commercially available materials. More desirably, using such a label, indicia is transferred to an item or object by a process that substantially reduces the curing cycle time and heat transferred to the item. Most desirably, such a label is stable and has a prolonged shelf life.

SUMMARY OF THE INVENTION

An ultraviolet post cure heat transfer label for application to an item includes a carrier web, an optional release coat applied to the carrier web and a composition including a cationic ultraviolet curable ink applied to the release coat. The ink has a solvent in a concentration of at a least about 20 percent by weigh, and preferably about 40 percent by weight, of the ink. The ink is dried to form a storable film on the carrier web.

A portion of the composition is transferred to the item (in the form of a label) using a heat transfer process, such as hot stamping, and the ink is cured by application of ultraviolet energy, following transfer of the label to the item.

The composition is formulated with an organic solvent. In this manner, the label is printed and dried (the solvent is driven off, forming a film) and can be stored for a prolonged period of time. The label is then transferred to the item and is then cured, only after transfer to the item.

A preferred composition includes a component capable of cationic polymerization, such as a cyclic ether, a vinyl ether or a hydroxyl containing compound. The composition further includes a photo-initiator, such as an onium salt, and a photo-sensitizer, such as a thioxanthone derivative. The labels use colors without any protective top clear coat or heat activated adhesive to avoid a halo and minimize the total number of print stations.

A method of making the labels and a method of marking an item with indicia from a hot stamp label are also disclosed.

These and other features and advantages of the present invention will be readily apparent from the following detailed description, in conjunction with the claims.

BRIEF DESCRIPTION OF THE DRAWINGS

The benefits and advantages of the present invention will become more readily apparent to those of ordinary skill in the relevant art after reviewing the following detailed description and accompanying drawing, wherein.

DETAILED DESCRIPTION OF THE INVENTION

Figure 1:
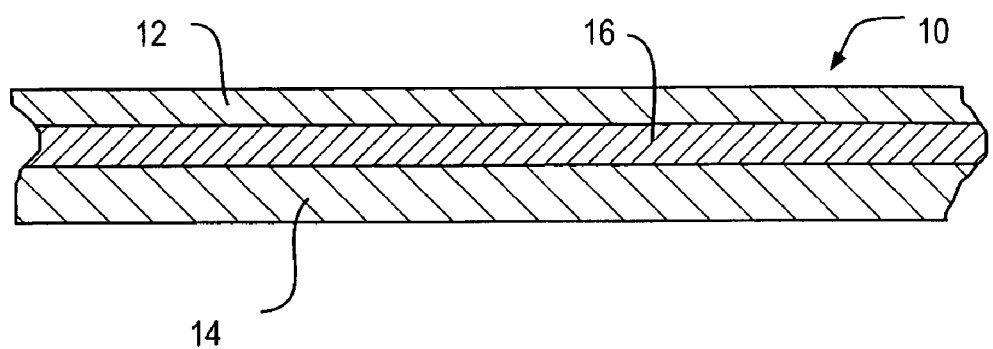
FIG. 1 is a cross-sectional view of a label embodying the principles of the present invention, the label being shown as formed on a carrier or web.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be understood that the title of this section of this specification, namely, "Detailed Description Of The Invention", relates to a requirement of the United States Patent Office, and does not imply, nor should be inferred to limit the subject matter disclosed herein.

In the present disclosure, the terms article, item, object, and product are used interchangeably to describe something that is produced that has commercial value and is, for example, an item that is the subject of a commercial transaction.

Referring briefly to FIG. 1, a heat transfer label 10 in accordance with the present invention is formed from a solvent borne cationic ultraviolet (UV) light energy curable ink 12 that is printed on a temporary carrier film or paper 14. The ink is capable of air drying to a non-blocking film without being subjected to UV radiation. The labels are capable of being stored for prolonged periods, for example, at least about twelve months, without any degradation in indicia quality or transfer capability.

The labels are transferred to the substrate by known heat transfer methods, such as reciprocal hot stamping, transfer by heated roller or the like. Following transfer onto the substrate, the labels are treated with (i.e., subjected to) UV radiation to cure the label to provide chemical and abrasion resistance.

The labels are formed on the temporary support layer, carrier or web. An optional release layer 16 is applied to the support layer, and the one or more solvent borne cationic UV curable inks are applied to the release layer. The inks are capable of forming a non-blocking film when dried using ambient or heated air. That is, the inks are dried on the carrier without irradiating with UV energy. The label is applied by itself or in roll form to the desired substrate using known heat transfer methods. Following application to the substrate, the label is treated with UV energy (in the form of UV light) to provide chemical and abrasion resistance with minimal generation of heat. Curing times of less than about twenty seconds have been found to successfully cure the inks on the substrate.

The temporary support layer (carrier) is a paper or plastic film. Suitable materials are polypropylene films, as well as polyester films, with polyester being more heat resistance. MYLAR® and MELINEX® are two the trademarks under which these materials are commercially available. Paper is less costly than plastic film, however, the dimensional stability of paper is less than desirable unless printing is conducted in a controlled environment with regard to temperature and relative humidity.

The optional release layer that is disposed between the carrier and the ink is generally a silicone coating that allows the ink to "cleanly" transfer to the desired substrate from the temporary support layer upon application of heat and pressure to the backside of the support layer. Without the release layer, portions of the label (ink) may not separate from support layer and as a result may stick and not fully transfer to the substrate. Those skilled in the art will recognize that there are coatings other than silicone that can be used as the release layer, such as QUILLON, commercially available from E.I. DuPont de Nemours and Co. of Wilmington, Del., as well as various waxes such as paraffin, microcrystalline or polyethylene glycol. Much of the wax coating transfers to the desired substrate along with the label and can be objectionable unless the substrate is subsequently exposed to a flame to smooth the wax and increase the gloss and transparency.

The solvent borne cationic UV curable inks contain a wetting agent capable of producing a uniform deposit of ink on the silicone coated support in order to alleviate the use of a wax release layer and subsequent post flame treatment. Suitable wetting agents include silicone-silica blends such as TEGO® Foamex N, commercially available from Degussa Goldschmidt of Hopewell, Va.

The ink components that are capable of cationic polymerization with UV radiation include cyclic ethers, preferably epoxides, as well as vinyl ether and hydroxyl containing compounds. Suitable epoxides include aromatic, aliphatic and cycloaliphatic epoxy resins. Epoxy resins have at least one, preferably at least two, epoxy groups in the molecule. Cycloaliphatic diepoxides such as UVACURE® 1500 (a very pure grade of 3,4-epoxycyclohexyl-methyl-3,4-epoxycyclohexane carboxylate), with an epoxide equivalent weight of approximately 134 is suitable because of its low viscosity and rapid curing characteristics. In addition, such cycloaliphatic diepoxides, when cured, have good resistance to exterior exposure. Vinyl ethers are also suitable, but can be costly, and as such can be used as reactive diluents to lower viscosity. Suitable hydroxyl containing compounds include polyester polyols, vinyl resins like UCAR VAGH (commercially available from Dow Chemical Co.), acrylic resins such as JONCRYL® 587 (commercially available from Johnson Polymer, Inc., of Sturtevant, Wis.), epoxy resins, such as EPON 1009 (commercially available from Resolution Performance Products of Houston, Tex.), cellulose acetate butyrate resins, phenoxy resins and the like.

Other resins containing hydroxyl groups can be dissolved in solvents and dried with ambient or heated air to form non-blocking films without exposure to UV radiation. Other components capable of cationic UV polymerization are disclosed in Green et al., U.S. Pat. No. 4,299,938 and Misev, U.S. Pat. No. 6,235,807.

Cationic photo-initiators include several triaryl sulfonium salts as well and diaryl iodonium salts. A preferred photo-initiator is IRGACURE® 250, an iodonium salt, (commercially available from Ciba Specialty Chemicals Corporation of Tarrytown, N.Y.), which is available at 75 percent active in propylene carbonate. The present formulation includes the photo-initiator in a concentration of about 0.10 percent to 15 percent, and preferably about 0.5 percent to 5 percent by weight of the total formulation. IRGACURE® 250 is desired in that it has no heavy metals and has a good balance of reactivity, synthetic access and solubility in typical epoxy formulations. Other suitable cationic photo-initiators are disclosed in the aforementioned patent to Misev.

Photo-sensitizers used in the present label include thioxanthone derivatives such as isopropyl-thioxanthone (ITX) and 1-chloro-4-propoxy-thioxanthone (CPTX) (commercially available from Lambson Group Ltd. Of Harrogate, U.K.) and anthracene derivatives such as 2-ethyl-9,10-dimethoxy-anthracene (EDMA) and 9-hydroxy-methyl-anthracene (HMA) (commercially available from Sigma-Aldrich Co. of St. Louis, Mo.). A present formulation includes the photo-sensitizer in a concentration of about 0.1 percent to 10 percent, and preferably about 0.5 percent to 2.0 percent by weight of the total formulation.

Alpha-hydroxy-ketone derivatives such as IRGACURE® 184, DAROCUR® 1173 and IRGACURE® 2959 (all available from the above-noted Ciba Specialty Chemicals) are useful in the present formulation in a concentration of about 0.1 percent to 10 percent and preferably about 0.5 percent to 2.0 percent by weight of the total formulation.

Colorants useful in the present formulation include dyes, organic pigments and inorganic pigments. Rutile modification of titanium dioxide is a preferred white pigment to attain optimum opacity.

The present invention which uses cationic UV curable inks differs from conventional UV inks in that it uses about 20 percent to 70 percent solvents that are volatile organic components, VOC. This achieves a non-blocking film without irradiation with UV energy. Labels are printed on a temporary carrier film or paper, dried with ambient or heated air, and stored in rolls or sheets. The labels are applied to various substrates with heat and pressure (heat transferred) and cured with UV irradiation (in the form of UV light) in less than about twenty seconds. This curing period provides good heat and chemical resistance without the need for a thermal bake, which requires about 10 to 60 minutes and can cause damage to the substrate due to excessive heat, the present UV irradiation at less than about 20 seconds.

Conventional cationic UV curable inks typically do not contain solvents in that these inks are generally formulated so as to minimize or eliminate VOC emissions. Conventional UV curable inks do not form non-blocking films until irradiated with UV energy. And, once cationic UV curable inks are irradiated with UV energy they cannot be heat transferred to another substrate and made resistant to heat and chemicals.

Moreover, conventional cationic UV curable inks are generally include at least one compound that is capable of polymerization by exposure to UV radiation, at least one sulfonium or iodonium salt as a photo-initiator, at least one pigment or dye, and at least one photo-sensitizer. However, the use of solvents in conventional UV curable formulations is limited, if used at all, to sparing amounts to lower viscosity and enable the formulation to be sprayed followed by curing with UV light having a wavelength of 200 to 600 nanometers to form a non-blocking film. UV radiation sources can be, for example, include mercury vapor lamps, FUSION™ D and V bulbs and the like.

The present labels use colors without any protective clear coat or heat activated adhesive. This avoids the appearance of a halo and minimizes the total number of print stations.

Printing methods for the present label include flexo, gravure and screen printing. Gravure generally requires long runs due to the high cost of cylinders. Flexo and gravure both use solvents with much lower boiling points than screen printing, and screen printing provides the thickest ink deposit. Hot stamping foils and pad printing are also anticipated to be used with the present labels.

Labels were prepared and applied to a substrate in accordance with the present invention. A formulation of a pigment paste (formulated from 39.64 percent by weight cyclohexanone, 3.14 percent by weight gamma butyrolactone, 14.26 percent by weight UCAR VAGH, 5.70 percent by weight butyl benzyl phthalate (a plasticizer), 0.37 percent by weight Solsperse 20000 (a pigment wetting agent commercially available from Avecia Pigments & Additives of Wilmington, Del.) and 11.14 percent by weight Irgazine DPP Red BO (a red pigment commercially available from Ciba Specialty Chemicals)), UV curable components including the UCAR VAGH and 12.09 percent by weight cycloaliphatic diepoxide commercially available under the above noted trademark UVACURE® 1500), 2.54 percent by weight cationic UV photoinitiator (Irgacure 250), 0.47 percent by weight photosensitizer (Speedcure CPTX), 0.47 percent by weight free radical photoinitiator and an alpha-hydroxylketone (Irgacure 2959), 3.81 percent by weight hydrophobic fumed silica (commercially available from Cabot Corporation of Boston, Mass. under the trade name Cabosil® TS-610, 6.00 percent by weight Teflon wax (commercially available from Shamrock Technologies, Inc. under the trade name SST-3) and 0.37 percent by weight defoamer (Foamex N), to form the ink.

The ink was screen printed through a stainless steel mesh screen with 270 lines per inch onto a 0.001-inch (1 mil) thick polyester film that was coated with a silicone release coating. The ink was dried for 1–2 minutes with forced air at about 100° F. to 200° F. and cooled.

The labels were then applied to 0.25-inch thick black acrylonitrile butadiene styrene (ABS) panels with a heated roller. The roller was coated with 0.125 inch to 0.25-inch RTV silicone rubber. The surface temperature of the silicone rubber was 200° F. to 450° F. The speed of the roller was adjusted from about 6 to 90-feet per minute at a pressure of about 1.5 Mpa to 5.5 Mpa. It is anticipated that a vertical hot stamping machine could have been used instead of the heated roller provided that the label was less than 100 square centimeters in area.

The labels on the ABS substrate were irradiated with light having a wavelength of about 200 to 600 nm with the belt speed under the UV lamp of about 6 to 90-feet per minute. UV radiation sources can be, fare known in the art and include mercury vapor lamps as well as Fusion D and V bulbs.

All patents referred to herein, are hereby incorporated herein by reference, whether or not specifically done so within the text of this disclosure.

In the disclosures, the words "a" or "an" are to be taken to include both the singular and the plural. Conversely, any reference to plural items shall, where appropriate, include the singular.

From the foregoing it will be observed that numerous modification and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. An ultraviolet post cure heat transfer label for application to an item, comprising:
    a carrier web;
    a release coat applied to the carrier web; and
    a composition including a cationic ultraviolet curable ink applied to the carrier web, the ink having a solvent in a concentration of at a least about 20 percent by weight of the ink, the ink being dried to form a storable film on the carrier web,
    wherein the composition is transferred to the item and the ink is cured, by application of ultraviolet energy, following transfer to the item.

2. The heat transfer label in accordance with claim 1 wherein solvent is present in a concentration of about 20 percent to 70 percent by weight of the composition.

3. The heat transfer label in accordance with claim 2 wherein solvent is present in a concentration of about 40 percent by weight of the composition.

4. The heat transfer label in accordance with claim 1 wherein the solvent is an organic solvent.

5. The heat transfer label in accordance with claim 1 wherein the composition includes a component capable of cationic polymerization includes one or more of a cyclic ether, a vinyl ether or a hydroxyl containing compound.

6. The heat transfer label in accordance with claim 5 wherein the composition includes an epoxide being an aromatic, an aliphatic or a cycloaliphatic epoxy resin.

7. The heat transfer label in accordance with claim 1 wherein the composition includes a photo-initiator.

8. The heat transfer label in accordance with claim 7 wherein the photo- initiator is an onium salt.

9. The heat transfer label in accordance with claim 1 wherein the composition includes a photo-sensitizer.

10. The heat transfer label in accordance with claim 9 wherein the photo- sensitizer is a thioxanthone derivative.

11. The heat transfer label in accordance with claim 1 including a colorant.

12. The heat transfer label in accordance with claim 11 wherein the colorant is a dye, an organic pigment or an inorganic pigment.

* * * * *